(12) United States Patent
Wen

(10) Patent No.: US 10,986,937 B2
(45) Date of Patent: Apr. 27, 2021

(54) STRUCTURE OF INFLATABLE BED

(71) Applicant: EVERMAX ECO INDUSTRY LTD., Jiashan (CN)

(72) Inventor: Ta-Sen Wen, Jiashan (CN)

(73) Assignee: Evermax Eco Industry Ltd., Jiashan (CN)

(*) Notice: Subject to any disclaimer, the term of this patent is extended or adjusted under 35 U.S.C. 154(b) by 232 days.

(21) Appl. No.: 16/233,469

(22) Filed: Dec. 27, 2018

(65) Prior Publication Data
US 2020/0205579 A1 Jul. 2, 2020

(51) Int. Cl.
| | | |
|---|---|---|
| *A47C 27/08* | (2006.01) | |
| *F16K 15/20* | (2006.01) | |
| *A47C 27/10* | (2006.01) | |
| *A47C 19/02* | (2006.01) | |

(52) U.S. Cl.
CPC .......... *A47C 27/081* (2013.01); *A47C 19/025* (2013.01); *A47C 27/10* (2013.01); *F16K 15/20* (2013.01)

(58) Field of Classification Search
CPC ..... A47C 27/08; A47C 27/081; A47C 27/087; A47C 27/10; A47C 19/025; A47C 19/12; F16K 15/185
See application file for complete search history.

(56) References Cited

U.S. PATENT DOCUMENTS

| | | | | |
|---|---|---|---|---|
| 2,604,641 | A * | 7/1952 | Reed | A47C 27/087 |
| | | | | 5/710 |
| 2,743,510 | A * | 5/1956 | Mauney | A47C 27/087 |
| | | | | 428/12 |
| 3,205,106 | A * | 9/1965 | Cross | B29D 22/02 |
| | | | | 156/79 |
| 4,513,463 | A * | 4/1985 | Santo | A47C 27/10 |
| | | | | 5/681 |
| 5,421,044 | A * | 6/1995 | Steensen | A47C 27/082 |
| | | | | 5/710 |

(Continued)

OTHER PUBLICATIONS

Blue Water Toys Inflatable 4 Person Floating Deck Wet Lounge, 7.5ft+7.5ft+6in—BWL7676S https://web.archive.org/web/20160830142344/https://www.bluewatertoys.com/products/blue-water-toys-products/inflatable-wet-lounge-large-water-raft-float-bwdk1-886.htm (Year: 2016).*

*Primary Examiner* — David R Hare
(74) *Attorney, Agent, or Firm* — Rosenberg, Klein & Lee

(57) ABSTRACT

An improved structure of inflatable bed includes: an inflatable mattress having an upper surface, a lower surface, and a lateral side structure that has upper and lower edges respectively connected to edges of the upper and lower surfaces so that the inflatable mattress is formed with an air charging space, the lateral side structure including a first charging valve in communication with the air charging space, the air charging space being provided therein with a Drop-stitching construction fabric having upper and lower ends respectively connected to the upper and lower surfaces; and an inflatable frame including at least one inflatable tubular body and outer layer cloth covering the inflatable tubular body. The inflatable tubular body includes a second charging valve. The inflatable frame is positioned on a bottom side of the inflatable mattress. The inflatable frame includes elastic braided bands to prevent undesired outward expansion of the inflatable frame after inflation.

12 Claims, 4 Drawing Sheets

(56) References Cited

U.S. PATENT DOCUMENTS

| | | | | |
|---|---|---|---|---|
| 5,598,593 | A * | 2/1997 | Wolfe | A47C 27/081 5/710 |
| 6,076,214 | A * | 6/2000 | Klimenko | A47C 27/081 5/706 |
| 6,754,925 | B1 * | 6/2004 | Wang | A47C 27/081 5/706 |
| 7,234,183 | B2 * | 6/2007 | Elrod | A47C 27/081 5/699 |
| 7,254,853 | B1 * | 8/2007 | Kim | A47C 27/081 5/710 |
| 7,591,036 | B2 * | 9/2009 | Lin | A47C 27/081 5/711 |
| 8,562,773 | B2 * | 10/2013 | Lin | B32B 5/022 156/166 |
| 8,702,461 | B1 * | 4/2014 | d'Offay | B63B 35/58 441/40 |
| 9,247,827 | B2 * | 2/2016 | Lin | A47C 27/10 |
| 10,582,772 | B2 * | 3/2020 | Hewitt | H05K 7/1488 |
| 2010/0111613 | A1 * | 5/2010 | Rista | B63B 35/34 405/219 |
| 2012/0031265 | A1 * | 2/2012 | Song | A47C 27/087 92/145 |

* cited by examiner

STRUCTURE OF INFLATABLE BED

FIELD OF THE INVENTION

The present invention relates to an inflatable bed, and more particularly to an improved structure of an inflatable bed that is made up of an inflatable mattress and inflatable bed frame that are combined together to provide an excellent effect of cushioning.

BACKGROUND OF THE INVENTION

Modern people, who suffer significant living stress caused by extreme fast pace of modern living, seek for better relaxation both physically and mentally through relief of pressure with good quality of sleeping. Thus, mattresses that could comfort users and helps improve quality of sleeping are commonly purchased and widely used.

Commonly, a mattress is placed on a bed frame or a bed base to allow a user to lie down on the mattress for sleeping and to provide support to the back of the user. However, mattresses that are provided for use with a twin-size bed or a bed of an even larger size are not good for shipping and transportation. Further, to improve comfortability, a mattress is commonly made up of multiple independent spring coils arranged inside the mattress so as to only form an effect of bearing a longitudinally downward-pressing force for a user lying on the mattress, but this increases a great amount of weight to the mattress, resulting in an even greater burden for shipping and transportation.

In view of the above, this invention aims to provide an improved structure of an inflatable bed that helps overcome the shortcomings of the prior art and improve industrial utilization.

SUMMARY OF THE INVENTION

The primary objective of the present invention is to provide an improved structure of an inflatable bed, which is formed of an inflatable mattress and the inflatable frame combinable with each other, with elastic braided bands arranged on a surface of the inflatable frame that is in contact with the inflatable mattress, so that after inflation for use, the elastic braided bands and the inflatable frame that are so coupled may provide mutual stretching therebetween that achieves effects of cushioning simultaneously in multiple directions, including an up-down (vertical) direction and a left-right (horizontal) direction and may also demonstrates deflatability that allows a user to adjust or change stiffness of the inflatable mattress and the inflatable frame after inflation to thereby making a user lying on the inflatable mattress may feel comfortable, and also allowing for easy storage and transportation as being so deflated.

Thus, to achieve the above objective, the present invention provides an improved structure of an inflatable bed, which comprises: an inflatable mattress, which comprises an upper surface, a lower surface, and a lateral side structure, the lateral side structure having upper and lower edges that are respectively connected to edges of the upper surface and the lower surface so that the inflatable mattress is formed with an air charging space, the lateral side structure being provided, on one side thereof, with a first charging valve that is in communication with the air charging space, the air charging space being provided with a Drop-stitching construction fabric arranged in an interior thereof, the Drop-stitching construction fabric having an upper end and a lower end that are respectively connected to the upper surface and the lower surface; and an inflatable frame, which comprises at least one inflatable tubular body and outer layer cloth that wraps around the inflatable tubular body, wherein the inflatable tubular body comprises an annular tube and having a second charging valve in communication with an interior of the inflatable tubular body, the inflatable frame being arranged on a bottom of the inflatable mattress to be in contact with the lower surface thereof, the inflatable frame being provided, on a surface thereof that is in contact with the lower surface, with a plurality of elastic braided bands.

In the above-described improved structure of the inflatable bed, the elastic braided bands are arranged parallel to each other.

In the above-described improved structure of the inflatable bed, the inflatable mattress and the inflatable frame are combinable with and fixed to each other by at least one first coupling unit, the first coupling unit comprising a first coupling element mounted to the lateral side structure of the inflatable mattress and a first counterpart coupling element mounted to a lateral side of the inflatable frame, the first coupling element being removably coupleable to the first counterpart coupling element through releasable engagement therebetween.

In the above-described improved structure of the inflatable bed, the inflatable tubular body is provided with a number of two, of which one of the inflatable tubular bodies is disposed inside another one of the inflatable tubular bodies, the two inflatable tubular bodies being provided with at least one communication port therebetween.

In the above-described improved structure of the inflatable bed, two ends of each of the elastic braided bands that are connected to the inflatable frame are each connected by means of a connector to the inflatable frame.

In the above-described improved structure of the inflatable bed, the inflatable tubular body is made of a thermoplastic polyurethane (TPU) material.

In the above-described improved structure of the inflatable bed, an enclosure structure is further included, wherein the enclosure structure encloses the inflatable mattress and the inflatable frame therein.

In the above-described improved structure of the inflatable bed, the enclosure structure comprises a top cover and a bottom cradle, the top cover and the bottom cradle being combinable with and fixed to each other by means of a second coupling unit, the second coupling unit comprising a second coupling element mounted to the top cover and a second counterpart coupling element mounted to the bottom cradle, the second coupling element being removably coupleable to the second counterpart coupling element through releasable engagement therebetween, so that the top cover is combined with and fixed to a top side of the bottom cradle by means of the coupling of the second coupling element to the second counterpart coupling element.

In the above-described improved structure of the inflatable bed, the top cover and the bottom cradle are provided with holes that respectively correspond to the first charging valve and the second charging valve to allow the first charging valve and the second charging valve extends out of the holes for air charging.

In the above-described improved structure of the inflatable bed, the bottom cradle and a bottom of the inflatable frame are combined with and fixed to each other by means of at least one third coupling unit, the third coupling unit comprising a third coupling element mounted to the bottom cradle and a third counterpart coupling element mounted to the bottom of the inflatable frame, the third coupling element being removably coupleable to the third counterpart coupling element through releasable engagement therebetween.

DETAILED DESCRIPTION OF THE PREFERRED EMBODIMENTS

Figure 1A:
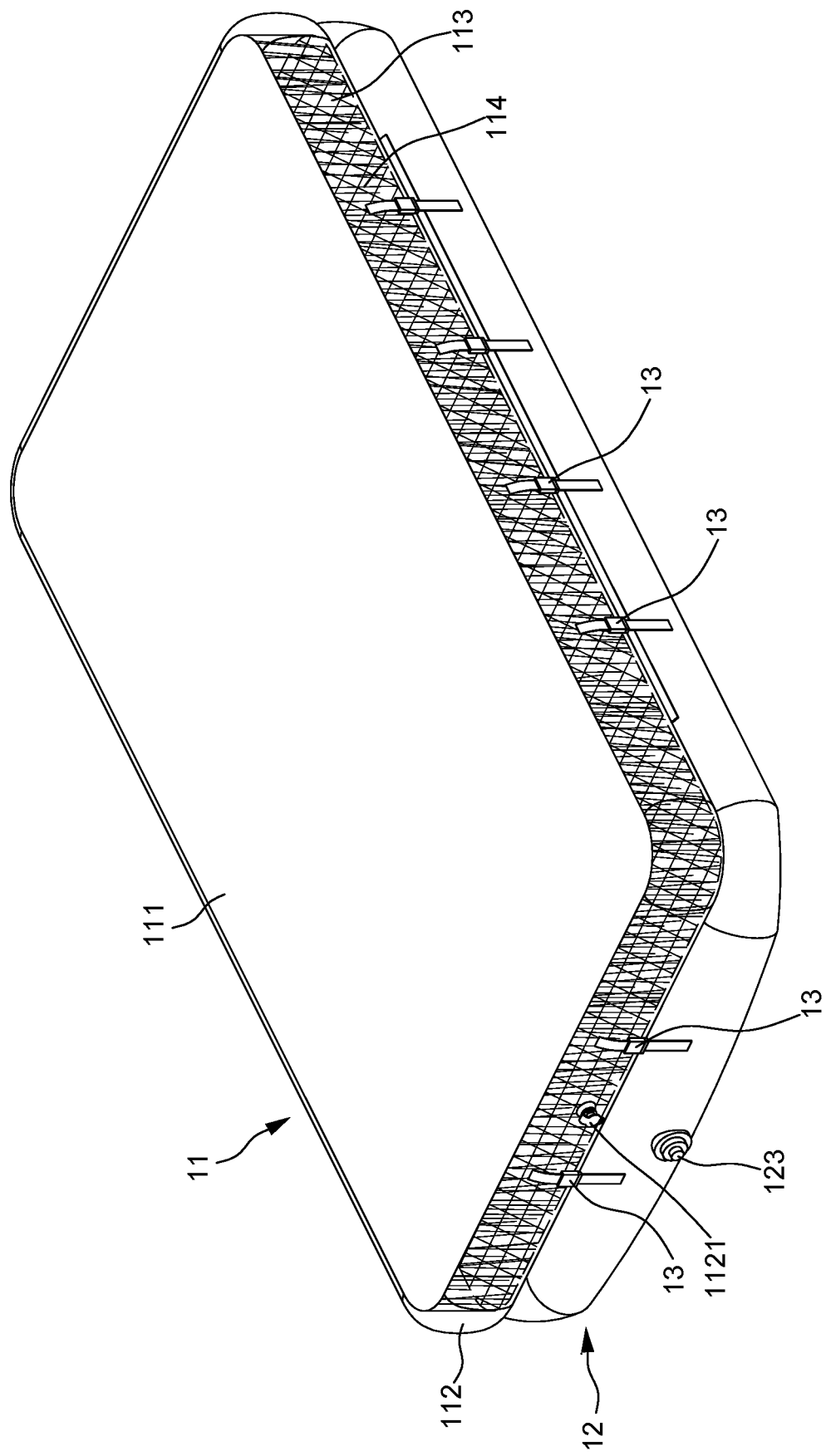
FIG. 1A is a perspective view illustrating an improved structure of an inflatable bed according to a first embodiment of the present invention.

Examples of embodying the present invention are described below with reference to FIGS. 1A to 2B. The description is not intended to limit the present invention to any specific way of embodiment, and instead, provides just illustrative embodiments of the present invention. In the drawings and the embodiments, identical or similar reference numerals are used to designate identical, substantially identical, or functionally identical components or elements throughout all the drawings. The drawings are provided in a simplified schematic form, and the drawings are not drawn to accurate scale for all the embodiments illustrated.

Figure 1B:
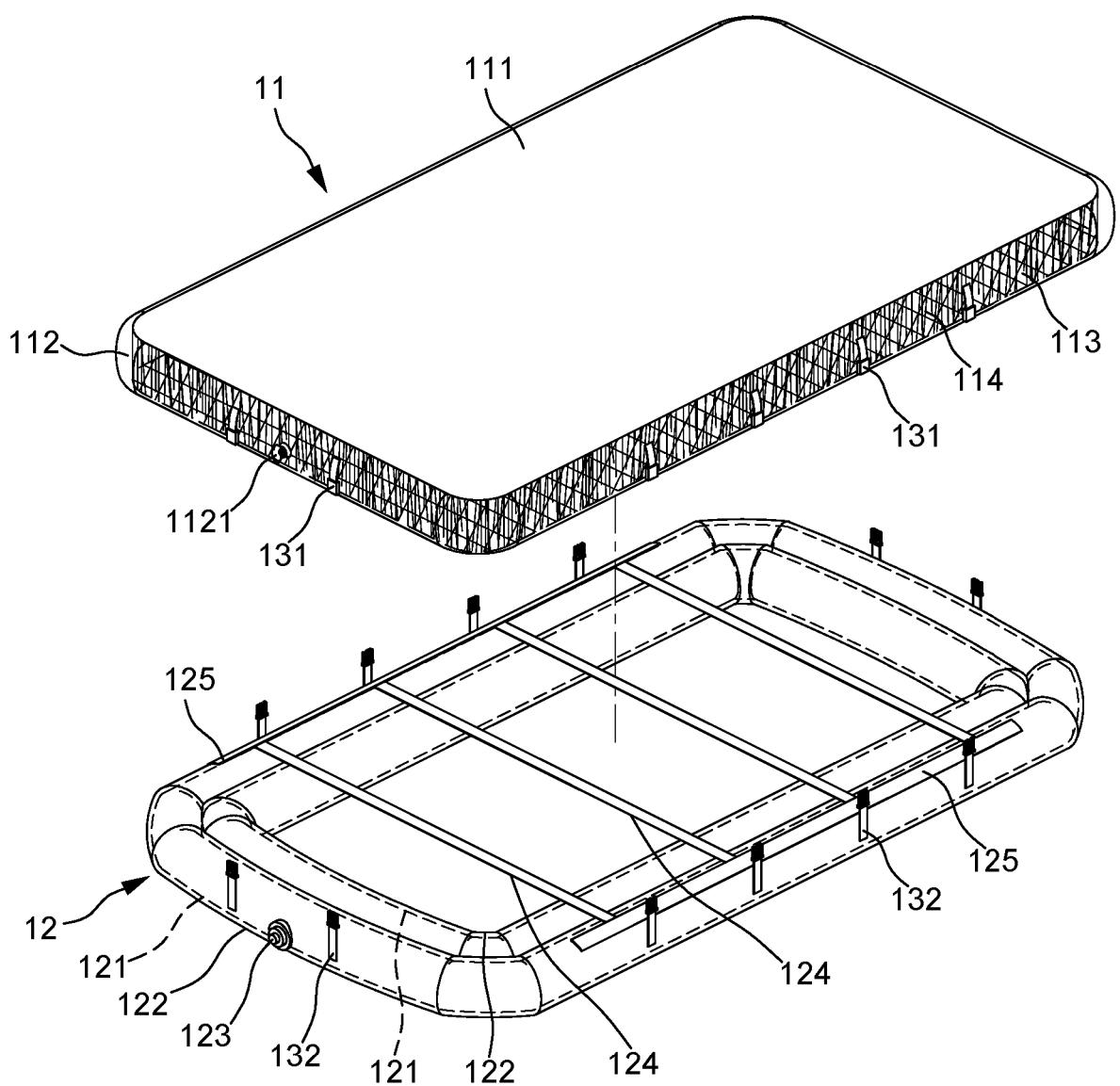
FIG. 1B is an exploded view of the improved structure of the inflatable bed according to the first embodiment of the present invention.

Firstly, reference being first directed to FIGS. 1A and 1B, the present invention provides an improved structure of an inflatable bed, which comprises: an inflatable mattress 11, which comprises an upper surface 111, a lower surface (not visible in the drawings), and a lateral side structure 112, the lateral side structure 112 having upper and lower edges that are respectively connected to edges of the upper surface 111 and the lower surface so that the inflatable mattress 11 is formed with an air charging space 113, the lateral side structure 112 being provided, on one side thereof, with a first charging valve 1121 that is in communication with the air charging space 113, the air charging space 113 being provided with a Drop-stitching construction fabric 114 in an interior thereof, the Drop-stitching construction fabric 114 having an upper end and a lower end that are respectively connected to the upper surface 111 and the lower surface; and an inflatable frame 12, which comprises at least one inflatable tubular body 121 and outer layer cloth 122 that wraps around the inflatable tubular body 121, wherein the inflatable tubular body 121 comprises an annular tube arranged in the form of a loop and having a second charging valve 123 in communication with an interior of the inflatable tubular body 121, the inflatable frame 12 being arranged on a bottom of the inflatable mattress 11 to be in contact with the lower surface thereof, the inflatable frame 12 being provided, on a surface thereof that is in contact with the lower surface, with a plurality of elastic braided bands 124, wherein the elastic braided bands 124 are arranged parallel to each other in order to constrain the inflatable frame 12 from being expanded outward after being inflated and a stretching force is applied to the elastic braided bands 124 by the inflatable frame 12 in order to prevent the elastic braided bands 124 from readily sagging.

For example, the inflatable frame 12, after inflation, may have an increased internal pressure and the elasticity of the elastic braided bands 124 may constrain outward expansion of the inflatable frame 12 to achieve a cushioning effect in a horizontal, left-right direction. Or, alternatively, when the inflatable mattress 11 carries an increased load (such as a user having a great body weight), the inflatable frame 12, after being inflated, would provide an outward stretching force to the elastic braided bands 124 so as to prevent the elastic braided bands 124 from sagging thereby achieving a cushioning effect in a vertical up-down direction. Thus, the inflatable frame 12 functions not only to support the inflatable mattress 11, but also to achieve cushioning effects in multiple directions, including an up-down (vertical) direction and a left-right (horizontal) direction, by means of the elastic braided bands 124 and the inflatable frame 12 mutually stretching and supporting each other, so as to make a user lying on the inflatable mattress 11 comfortable.

In addition, the inflatable mattress 11 and the inflatable frame 12 are combined and fixed together by means of at least one first coupling unit 13 (such as hooks, buckles, and similar fastening measures) so as to enhance stability of the inflatable mattress 11 stacked and positioned on the inflatable frame 12. The first coupling unit 13 comprises a first coupling element 131 mounted to the lateral side structure 112 of the inflatable mattress 11 and a first counterpart coupling element 132 mounted to a lateral side of the inflatable frame 12. The first coupling element 131 is removably coupled to the first counterpart coupling element 132 through releasable engagement therebetween.

However, as shown in FIG. 1B, two inflatable tubular bodies 121 are used, wherein a first one (an internal one) of the inflatable tubular bodies 121 is disposed inside and inboard a second one (an external one) of the inflatable tubular bodies 121 and the two inflatable tubular bodies 121 are provided with at least one communication port (not shown in the drawings) therebetween, so that when the external inflatable tubular body 121 is inflated by means of the second charging valve 123, air or gas that is charged is allowed to flow through the communication port into the internal inflatable tubular body 121, and as such, only one second charging valve 123 is sufficient to inflate both the internal and external inflatable tubular bodies 121. As such, when the elastic braided bands 124 are acted upon by a down-pressing force, the inflatable tubular bodies 121 of an increased number would provide a force that is stronger than that provided by just one single inflatable tubular body 121 to stretch and hold the elastic braided bands 124 in position, so as to reduce an amount of sagging of the elastic braided bands 124.

Further, to reinforce the connecting strength that the elastic braided bands 124 are connected to the inflatable tubular body 121, two ends of each of the elastic braided bands 124 that are connected to the inflatable frame 12 are each connected by means of a connector 125 to the inflatable frame 12.

The inflatable tubular body 121 can be made of a thermoplastic polyurethane (TPU) material so as to bear an increased pressure during the inflation of the inflatable tubular body 121.

Figure 2A:
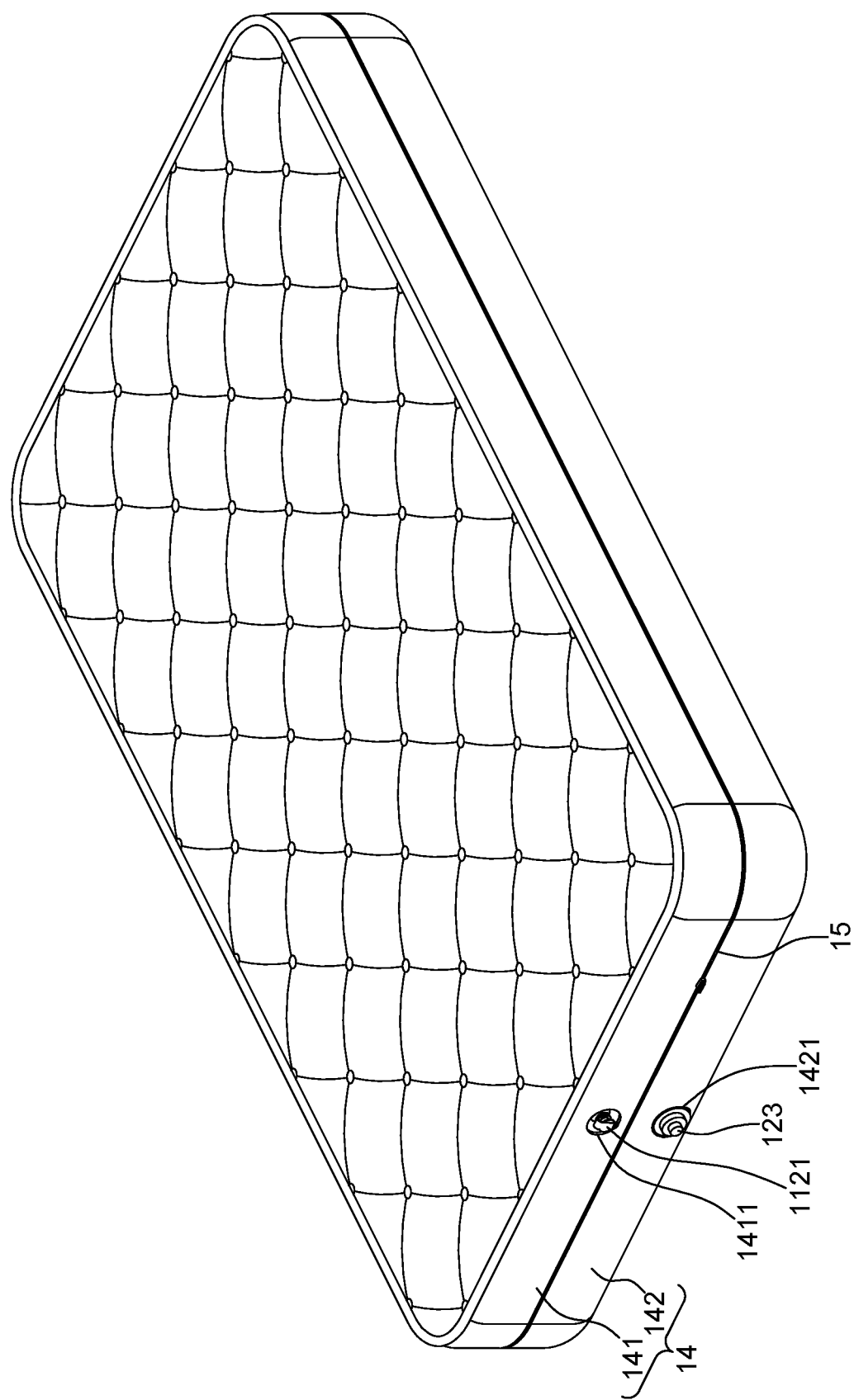
FIG. 2A is a perspective view illustrating an improved structure of an inflatable bed according to a second embodiment of the present invention.
Figure 2B:
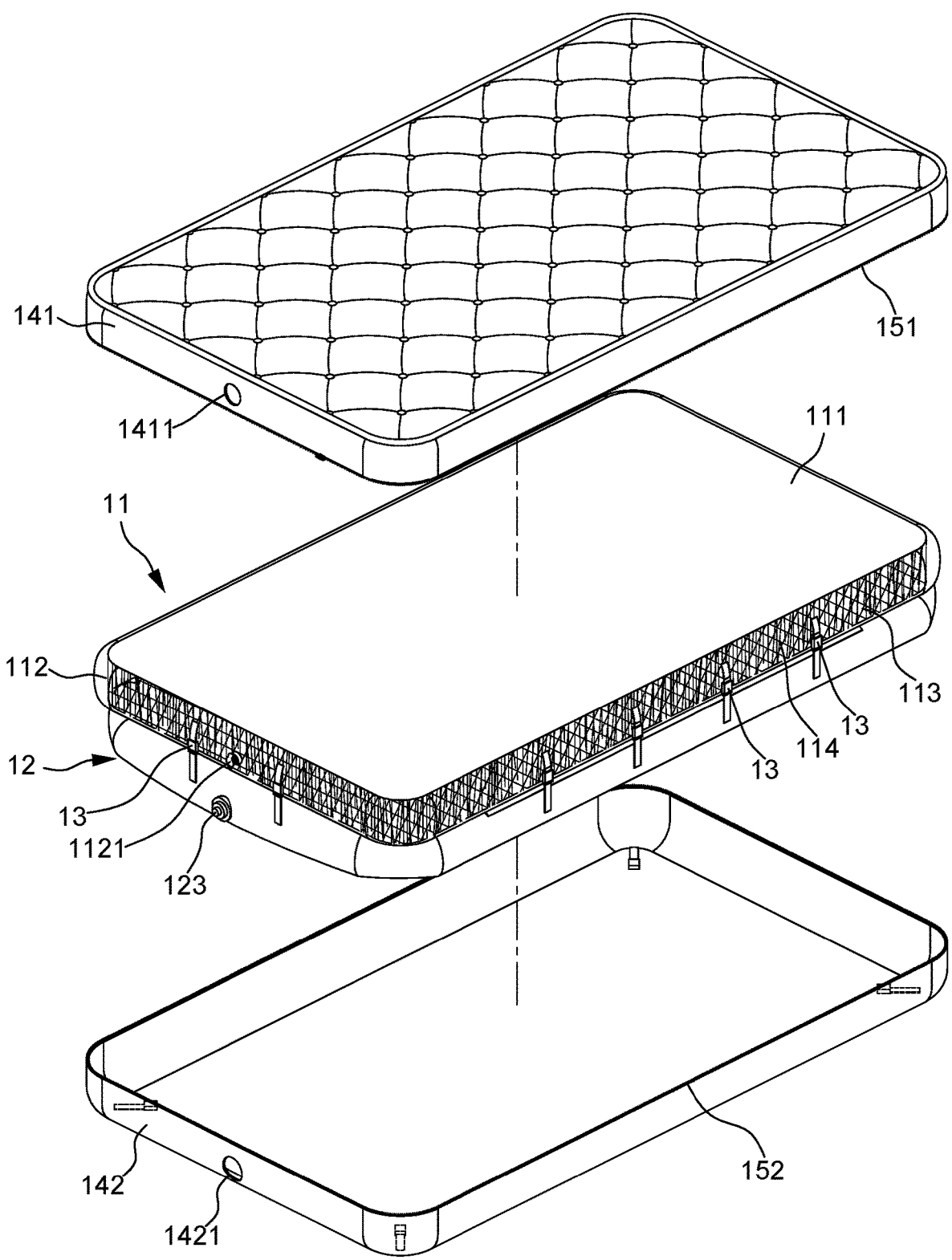
FIG. 2B is an exploded view of the improved structure of the inflatable bed according to the second embodiment of the present invention.

Further, with reference to FIGS. 2A and 2B, the present invention further comprises an enclosure structure 14, and the enclosure structure 14 encloses and covers the inflatable mattress 11 and the inflatable frame 12 therein. The enclosure structure 14 comprises a top cover 141 and a bottom cradle 142. The top cover 141 and the bottom cradle 142 are combinable and fixed together by means of a second coupling unit 15 (such as a zipper). The second coupling unit 15 comprises a second coupling element 151 mounted to the top cover 141 and a second counterpart coupling element 152 mounted to the bottom cradle 142. The second coupling element 151 is removably coupled to the second counterpart coupling element 152 through releasable engagement therebetween so that the top cover 141 is combined with and fixed to a top side of the bottom cradle 142 by means of the coupling of the second coupling element 151 to the second counterpart coupling element 152. Further, the top cover 141 are the bottom cradle 142 are provided with holes 1411, 1421 that respectively correspond to the first charging valve 1121 and the second charging valve 123 to allow the first charging valve 1121 and the second charging valve 123 to extend through the holes 1411, 1421 to partially project outside for easing an operation of inflation.

Finally, to enhance of stability of the inflatable frame 12 disposed inside the enclosure structure 14, the bottom cradle 142 and a bottom of the inflatable frame 12 are combined with and fixed together by means of at least one third coupling unit. The third coupling unit may comprise a third coupling element mounted to the bottom cradle 142 and a third counterpart coupling element mounted to the bottom of the inflatable frame 12. The third coupling element is removably coupled to the third counterpart coupling element through releasable engagement therebetween, and the third coupling unit may be of the same type as the first coupling unit.

Thus, the present invention provides an improved structure of an inflatable bed, which is formed of an inflatable mattress and an inflatable frame that combinable with each other, with elastic braided bands arranged on a surface of the inflatable frame that is in contact with the inflatable mattress, so that after inflation for use, the elastic braided bands and the inflatable frame that are so coupled may provide mutual stretching therebetween that achieves effects of cushioning simultaneously in multiple directions, including an up-down (vertical) direction and a left-right (horizontal) direction and may also demonstrates deflatability that allows a user to adjust or change stiffness of the inflatable mattress and the inflatable frame after inflation to thereby making a user lying on the inflatable mattress may feel comfortable, and also allowing for easy storage and transportation as being so deflated.

What is claimed is:

1. An improved structure of an inflatable bed, comprising:
    an inflatable mattress, which includes an upper surface, a lower surface, and a lateral side structure, the lateral side structure having upper and lower edges respectively connected to edges of the upper surface and the lower surface, the inflatable mattress is thereby formed with an air charging space, the lateral side structure being provided on one side thereof with a first charging valve in communication with the air charging space, the air charging space being provided with a drop-stitching construction fabric arranged in an interior thereof, the drop-stitching construction fabric having an upper end and a lower end respectively connected to the upper surface and the lower surface; and
    an inflatable frame, which includes at least one inflatable tubular body and an outer layer cloth wrapped around the inflatable tubular body, wherein the at least one inflatable tubular body includes an annular tube and a second charging valve in communication with an interior of the inflatable tubular body, the inflatable frame being arranged on a bottom of the inflatable mattress to be in contact with the lower surface thereof, the inflatable frame being provided with a plurality of elastic braided bands on a surface thereof that is in contact with the lower surface;
    wherein the inflatable mattress and the inflatable frame are combinable with and fixed to each other by at least one first coupling unit, the at least one first coupling unit including a first coupling element mounted to the lateral side structure of the inflatable mattress and a first counterpart coupling element mounted to a lateral side of the inflatable frame, the first coupling element being removably coupleable to the first counterpart coupling element through releasable engagement therebetween.

2. The improved structure of the inflatable bed according to claim 1, wherein the plurality of elastic braided bands are arranged parallel to each other.

3. The improved structure of the inflatable bed according to claim 1, wherein a number of the at least one inflatable tubular body is two, of which, one of the inflatable tubular bodies is disposed inside another one of the inflatable tubular bodies, the two inflatable tubular bodies being provided with at least one communication port therebetween.

4. The improved structure of the inflatable bed according to claim 1, wherein each of two ends of each of the elastic braided bands are connected to the inflatable frame by a connector.

5. The improved structure of the inflatable bed according to claim 1, wherein the at least one inflatable tubular body is made of a thermoplastic polyurethane (TPU) material.

6. The improved structure of the inflatable bed according to claim 1, further comprising an enclosure structure, wherein the enclosure structure encloses the inflatable mattress and the inflatable frame therein.

7. The improved structure of the inflatable bed according to claim 6, wherein the enclosure structure includes a top cover and a bottom cradle, the top cover and the bottom cradle being combinable with and fixed to each other by a second coupling unit, the second coupling unit including a second coupling element mounted to the top cover and a second counterpart coupling element mounted to the bottom cradle, the second coupling element being removably coupleable to the second counterpart coupling element through releasable engagement therebetween, the top cover is thereby combined with and fixed to a top side of the bottom cradle responsive to coupling between the second coupling element and the second counterpart coupling element.

8. The improved structure of the inflatable bed according to claim 7, wherein the top cover and the bottom cradle are provided with holes that respectively correspond to the first charging valve and the second charging valve to allow the first charging valve and the second charging valve to extend out of the holes for air charging.

9. The improved structure of the inflatable bed according to claim 7, wherein the bottom cradle and a bottom of the inflatable frame are combined with and fixed to each other by at least one third coupling unit, the at least one third coupling unit including a third coupling element mounted to the bottom cradle and a third counterpart coupling element mounted to the bottom of the inflatable frame, the third coupling element being removably coupleable to the third counterpart coupling element through releasable engagement therebetween.

10. An improved structure of an inflatable bed, comprising:
    an inflatable mattress, which includes an upper surface, a lower surface, and a lateral side structure, the lateral side structure having upper and lower edges respectively connected to edges of the upper surface and the lower surface, the inflatable mattress is thereby formed with an air charging space, the lateral side structure being provided on one side thereof with a first charging valve in communication with the air charging space, the air charging space being provided with a drop-stitching construction fabric arranged in an interior thereof, the drop-stitching construction fabric having an upper end and a lower end respectively connected to the upper surface and the lower surface;

an inflatable frame, which includes at least one inflatable tubular body and an outer layer cloth wrapped around the inflatable tubular body, wherein the at least one inflatable tubular body includes an annular tube and a second charging valve in communication with an interior of the inflatable tubular body, the inflatable frame being arranged on a bottom of the inflatable mattress to be in contact with the lower surface thereof, the inflatable frame being provided with a plurality of elastic braided bands on a surface thereof that is in contact with the lower surface; and an enclosure structure, the enclosure structure enclosing the inflatable mattress and the inflatable frame therein, wherein the enclosure structure includes a top cover and a bottom cradle, the top cover and the bottom cradle being combinable with and fixed to each other by a second coupling unit, the second coupling unit including a second coupling element mounted to the top cover and a second counterpart coupling element mounted to the bottom cradle, the second coupling element being removably coupleable to the second counterpart coupling element through releasable engagement therebetween, the top cover is thereby combined with and fixed to a top side of the bottom cradle responsive to coupling between the second coupling element and the second counterpart coupling element.

11. The improved structure of the inflatable bed according to claim 10, wherein the top cover and the bottom cradle are provided with holes that respectively correspond to the first charging valve and the second charging valve to allow the first charging valve and the second charging valve to extend out of the holes for air charging.

12. The improved structure of the inflatable bed according to claim 10, wherein the bottom cradle and a bottom of the inflatable frame are combined with and fixed to each other by at least one third coupling unit, the at least one third coupling unit including a third coupling element mounted to the bottom cradle and a third counterpart coupling element mounted to the bottom of the inflatable frame, the third coupling element being removably coupleable to the third counterpart coupling element through releasable engagement therebetween.

* * * * *